(12) United States Patent
Donovan et al.

(10) Patent No.: US 11,022,360 B2
(45) Date of Patent: Jun. 1, 2021

(54) METHOD FOR REDUCING CONDENSER SIZE AND POWER ON A HEAT REJECTION SYSTEM

(71) Applicant: Rolls-Royce North American Technologies Inc., Indianapolis, IN (US)

(72) Inventors: Eric Donovan, Fishers, IN (US); Michael Head, Mooresville, IN (US); Tim Unton, Avon, IN (US); Eugene Jansen, Stafford, VA (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 64 days.

(21) Appl. No.: 16/380,685

(22) Filed: Apr. 10, 2019

(65) Prior Publication Data
US 2020/0326114 A1    Oct. 15, 2020

(51) Int. Cl.
    *F25D 16/00*    (2006.01)
    *F25B 13/00*    (2006.01)
(52) U.S. Cl.
    CPC .............. *F25D 16/00* (2013.01); *F25B 13/00* (2013.01); *F25B 2400/24* (2013.01)
(58) Field of Classification Search
    CPC ...... F25D 16/00; F25B 13/00; F25B 2400/24; F25B 2600/2501; F25B 2600/027
    See application file for complete search history.

(56) References Cited

U.S. PATENT DOCUMENTS

| 3,091,944 | A | * | 6/1963 | Miner ..................... | F25B 13/00 62/159 |
| 4,143,705 | A | | 3/1979 | Awalt, Jr. | |
| 4,175,399 | A | * | 11/1979 | Edwards ............ | B60H 1/00007 62/172 |
| 4,333,316 | A | * | 6/1982 | Stamp, Jr. ............... | F25B 13/00 62/126 |
| 4,482,008 | A | * | 11/1984 | Nomaguchi ........... | F24F 11/085 165/240 |

(Continued)

FOREIGN PATENT DOCUMENTS

| DE | 11 2016 003 519.5 T5 | 4/2018 |
| DE | 11 2016 005 644.3 T5 | 8/2018 |

(Continued)

OTHER PUBLICATIONS

American Society of Heating, Refrigerating and Air-Conditioning Engineers, Inc., "2010 Ashrae Handbook, Refrigeration", Inch-Pound Edition, Chapter 4, Liquid Overfeed Systems, Atlanta, Georgia, 11 pgs.

(Continued)

*Primary Examiner* — Kun Kai Ma
(74) *Attorney, Agent, or Firm* — Brinks Gilson & Lione

(57) ABSTRACT

A heat transfer system for high transient heat loads includes a fluid, a heat exchanger; a compressor downstream of the heat exchanger outlet; a condenser downstream of the compressor outlet, and a thermal energy storage (TES) section downstream of the condenser outlet and upstream of the heat exchanger. The TES section may include a first pressure regulating valve downstream of a TES unit; and a second pressure regulating valve upstream of the first pressure regulating valve.

6 Claims, 7 Drawing Sheets

(56) References Cited

U.S. PATENT DOCUMENTS

| | | | |
|---|---|---|---|
| 4,742,868 A | | 5/1988 | Mitani et al. |
| 4,934,155 A | | 6/1990 | Lowes |
| 5,165,250 A | * | 11/1992 | Nagatomo ............ F24F 5/0017 62/158 |
| 5,353,602 A | * | 10/1994 | Pincus ................... F25B 41/06 165/903 |
| 5,678,626 A | | 10/1997 | Gilles |
| 7,185,506 B2 | | 3/2007 | Aflekt et al. |
| 7,648,598 B2 | | 1/2010 | Lee et al. |
| 8,176,722 B2 | * | 5/2012 | Blonn ................... F01K 25/06 60/39.181 |
| 9,212,834 B2 | | 12/2015 | Parsonnet et al. |
| 9,719,699 B2 | | 8/2017 | Tamura et al. |
| 10,520,231 B2 | | 12/2019 | Itou et al. |
| 10,723,203 B2 | | 7/2020 | Kato et al. |
| 2008/0000613 A1 | * | 1/2008 | Harpole ............. F28D 20/0039 165/10 |
| 2009/0049857 A1 | * | 2/2009 | Murakami ............ F25B 29/003 62/324.6 |
| 2009/0272128 A1 | | 11/2009 | Ali |
| 2011/0067427 A1 | | 3/2011 | Haller et al. |
| 2011/0146313 A1 | * | 6/2011 | Finckh ................... F25B 9/008 62/186 |
| 2012/0111036 A1 | | 5/2012 | Campbell et al. |
| 2013/0074531 A1 | | 3/2013 | Parsonnet et al. |
| 2013/0104582 A1 | * | 5/2013 | Sandkoetter ............ F25B 41/04 62/196.3 |
| 2013/0174589 A1 | * | 7/2013 | Wightman ............ F25B 47/006 62/81 |
| 2014/0230471 A1 | | 8/2014 | Bart |
| 2015/0114017 A1 | | 4/2015 | Hayashi et al. |
| 2015/0292775 A1 | | 10/2015 | Ma et al. |
| 2016/0178243 A1 | | 6/2016 | Derosier |
| 2016/0201931 A1 | | 7/2016 | Ma et al. |
| 2017/0292770 A1 | * | 10/2017 | Fowler .................. F25D 21/004 |
| 2018/0266709 A1 | | 9/2018 | Tucker et al. |
| 2019/0032979 A1 | | 1/2019 | Kasamatsu et al. |
| 2019/0226735 A1 | * | 7/2019 | Bissell ..................... F28D 7/02 |

FOREIGN PATENT DOCUMENTS

| | | |
|---|---|---|
| JP | H06-51756 U | 7/1994 |
| JP | 2012-145296 A | 8/2012 |
| JP | 2016-161226 A | 9/2016 |
| WO | WO 2013/038245 A1 | 3/2013 |

OTHER PUBLICATIONS

Tuo, H. and Hrnjak, P., "Flash Gas Bypass Method for Improving Performance of an A/C System With a Microchannel Evaporator", International Refrigeration and Air Conditioning Conference at Purdue University, Jul. 16-19, 2012, paper 1322, 11pgs.

Nakayama, N., et al., "Development of a Refrigerant Two-Phase Flow Distributor for a Room Air Conditioner", International Refrigeration and Air Conditioning Conference at Purdue University, Jul. 25-28, 2000, paper 497, 9pgs.

Equilibar, Precision Pressure Control, Service Conditions, "Back Pressure Regulator for Two-Phase Flow," Jan. 29, 2019, 4pgs. https://www.equilibar.com/back-pressure-regulators/severe-services/two-phase-flow/.

Equilibar, Precision Pressure Control, "Advanced Temperature Control Using Two-Phase Refrigerant Pressure Control", Jan. 29, 2019, 7pgs. https://www.equilibar.com/application/two-phase-refrigerant-control/.

Park, C. and Sunada, E., "Vapor Compression Hybrid Two-Phase Loop Technology for Lunar Surface Applications", Advanced Cooling Technologies, Inc., Lancaster, PA, Jan. 29, 2019, 12pgs. https://www.1-act.com/vapor-compression-hybrid-two-phase-loop-technology-for-lunar-surface-applications/.

Milosevic, A.S., "Flash Gas Bypass Concept Utilizing Low Pressure Refrigerants", Thesis, Graduate College of the University of Illinois at Urbana-Champaign, 2010, 316pgs.

Ashrae Online Handbook, Chapter 18. Absorption Equipment, Mar. 29, 2019, 25pgs. https:handbook.ashrae.org./Print.html?file=Handbooks/R18/IP/R18_Ch18/r18_ch18_ip.aspx#R18_Ch18_bibliol.

Tulapurkar, C., et al., "Phase Change Materials for Domestic Refrigerators to Improve Food Quality and Prolong Compressor Off Time", International Refrigeration and Air Conditioning Conference at Purdue University, School of Mechanical Engineering, Jul. 12-15, 2010, paper 1044, 9pgs.

Kumar, V., et al., "Energy Saving Using Phase Change Material in Refrigerating System", Conference Paper, Mar. 2016, 8pgs. https://www.researchgate.net/publication/311569637.

Advanced Cooling Technologies (ACT), "Phase Change Material Heat Sinks for Cooling | PCM Heat Exchanger & Thermal Storage", 2019, 13pgs. https://www.1-act.com/resources/thermal-storage/.

Advanced Cooling Technologies (ACT), "Vapor Compression System with PCM HX for Cooling High Power Lasers", Jan. 30, 2019, 4pgs. https://www.1-act.com/case-studies/vapor-compression-system-with-phase-change-material-heat-exchanger-for-cooling-high-power-lasers-and-direct-energy-weapon/.

Partial European Search Report, dated Sep. 8, 2020, pp. 1-12, issued in European Patent Application No. 20166551.0, European Patent Office, Munich, Germany.

Partial European Search Report, dated Sep. 10, 2020, pp. 1-12, issued in European Patent Application No. 20166570.0, European Patent Office, Munich, Germany.

U.S. Office Action dated Jul. 30, 2020, pp. 1-5, issued in U.S. Appl. No. 16/380,665, U.S. Patent and Trademark Office, Alexandria, VA.

Notice of Allowance dated Oct. 20, 2020, pp. 1-21, issued in U.S. Appl. No. 16/380,665, U.S. Patent and Trademark Office, Alexandria, VA.

Extended European Search Report, dated Dec. 11, 2020, pp. 1-10, issued in European Patent Application No. 20166551.0, European Patent Office, Munich, Germany.

* cited by examiner

METHOD FOR REDUCING CONDENSER SIZE AND POWER ON A HEAT REJECTION SYSTEM

CROSS REFERENCE TO RELATED APPLICATION

This application is related to concurrently filed and co-pending U.S. application Ser. No. 16/380,665, titled "Method for Reducing Condenser Size and Power on a Heat Rejection System,", first named inventor: Eric Donovan. This application is also related to concurrently filed and co-pending U.S. patent application Ser. No. 16/380,644, titled "Mechanically Pumped System for Direct Control of Two-Phase Isothermal Evaporation", first named inventor: Eugene Jansen. The entirety of each of these applications is incorporated herein by reference.

BACKGROUND

Conventional methods of rejecting heat from a refrigerant or cooling system, e.g., vapor compression systems or phase change cooling system, requires sizing the heat-rejecting component(s), e.g., the condenser and fans, for a maximum design heat load at a maximum design ambient temperature. However, many heat loads may operate on a cycle wherein the maximum heat load occurs during only a portion of that cycle. Additionally, the maximum design ambient temperature likely is not always present. Some heat-transfer systems employ complex, variable-frequency-drive compressors to facilitate the heat-rejection capacity control that are expensive and frequently operate the compressor away from its peak efficiency. Sizing the heat exchanger system for the maximum heat load at continuous duty cycle in the maximum expected ambient air condition results in an oversized, overweight, and overpowered condensing unit for those portions of the duty cycle that are neither at, nor near, the most limiting design conditions.

SUMMARY

According to some aspects of the present disclosure, a heat transfer system may include a primary fluid and a primary fluid flow path. The primary fluid may be disposed in the primary fluid flow path. The primary fluid flow path may include a heat exchanger with an inlet and an outlet, which transfers heat into the primary fluid; a compressor, with a compressor inlet and a compressor outlet. The compressor inlet may be downstream of and coupled to the heat exchanger outlet by a heat-exchanger-compressor conduit. The flow path may include a condenser, with a condenser inlet and a condenser outlet. The condenser inlet may be downstream of and coupled to the compressor outlet by a compressor-condenser conduit. The condenser may transfer heat out of the primary fluid. The flow path may also include a thermal energy storage (TES) section. The TES section may include an inlet and an outlet. The TES section inlet may be downstream of and coupled to the condenser outlet by a condenser-TES-section conduit. The TES-section outlet may be upstream of and coupled to the heat exchanger inlet by a TES-section-heat-exchanger conduit. The TES-section may include a TES unit having an inlet and outlet. The TES unit inlet may be downstream of and coupled to the TES section inlet by a TES-section-TES-unit-inlet conduit and the TES unit outlet may be upstream of and coupled to the TES Section outlet by a TES-unit-TES-section-outlet conduit. The TES-section may also include a first pressure regulating valve downstream of the TES unit; and a second pressure regulating valve upstream of the first pressure regulating valve and downstream of the condenser. The second pressure regulating valve may maintain the primary fluid at the condenser outlet at a first state when the heat transferred into a portion of the primary fluid by the heat exchanger may be equal to or less than the heat transferred out of the portion of the primary fluid by the condenser. The first pressure regulating valve may maintain the primary fluid at the TES unit outlet at the first state when the heat transferred into a portion of the primary fluid by the heat exchanger may be greater than the heat transferred out of the portion of the primary fluid by the condenser. The TES section may maintain the primary fluid at the TES section outlet as a liquid-vapor mixture.

In some embodiments, the first state may be at saturation pressure. In some embodiments, the first state may be a subcooled liquid. In some embodiments, the first state may be a saturated fluid. In some embodiments, the heat exchanger may be an evaporator. In some embodiments, the TES unit comprises a material selected from the group consisting of a phase change material, chilled water, chilled coolant, or two-phase mixture of water and ice. Some embodiments may include a bypass valve upstream of TES unit and downstream of the condenser. In some embodiments, the bypass valve may direct the primary fluid to the second pressure regulating valve in a first position or to the TES unit in a second position. Some embodiments may include a TES cooling fluid conduit coupled to the TES-section-heat-exchanger conduit and the bypass valve, wherein the bypass valve may be a four-way valve. In some embodiments, the bypass valve may be in parallel with the second pressure regulating valve. In some embodiments, the second pressure regulating valve maintains the primary fluid at the TES unit inlet as a liquid-vapor mixture. Same embodiments may include a first bypass valve downstream of the TES unit and coupled in parallel with the first pressure regulating valve; and, a second bypass valve upstream of the TES unit and coupled in parallel with the second pressure regulating valve. In some embodiments, the second pressure regulating valve may be upstream of the TES unit. In some embodiments, the TES-section-heat-exchanger conduit comprises an accumulator and a liquid pump, and the heat-exchanger-compressor conduit comprises the accumulator. Some embodiments may include a TES cooling fluid conduit coupling an outlet of the liquid pump and a four-way valve upstream of TES unit and downstream of the condenser.

According to some aspects of the present disclosure, a heat transfer system with a closed fluid flowpath may include in a direction of fluid flow a heat source, a compressor, a condenser, a first bypass valve in a first mode or a first pressure regulating valve in a second mode, a thermal energy storage (TES) unit, and a second pressure regulating valve in the first mode or a second bypass valve in the second mode. The TES unit may be a heat sink in the first mode and the TES unit may be a heat source or heat neutral in a second mode.

In some embodiments, the first pressure regulating valve may be a diaphragm-style back pressure regulating valve. In some embodiments, at least one of the first pressure regulating and the second pressure regulating valve may be a pneumatically controlled valve.

According to some aspects of the present disclosure, a heat transfer system with a fluid flowpath may include in a direction of fluid flow a heat source, a compressor, a condenser, a first input of a four-way valve, a thermal energy storage (TES) unit in a first mode or a first pressure regulating valve in a second mode, and a second pressure regulating valve. The TES unit may be a heat sink in the first mode and the TES unit may be a heat source or heat neutral in a second mode.

In some embodiments, the TES unit may include a material selected from the group consisting of a phase change material, chilled water, chilled coolant, or two-phase mixture of water and ice. In some embodiments, the heat source may be an evaporator. Some embodiments may include an accumulator; and a pump. Some embodiments may include a second flow path which itself may include the pump, a second input of the four-way valve, the TES unit, the second pressure regulating valve, and the accumulator.

BRIEF DESCRIPTION OF THE DRAWINGS

The following will be apparent from elements of the figures, which are provided for illustrative purposes.

Figure 1:
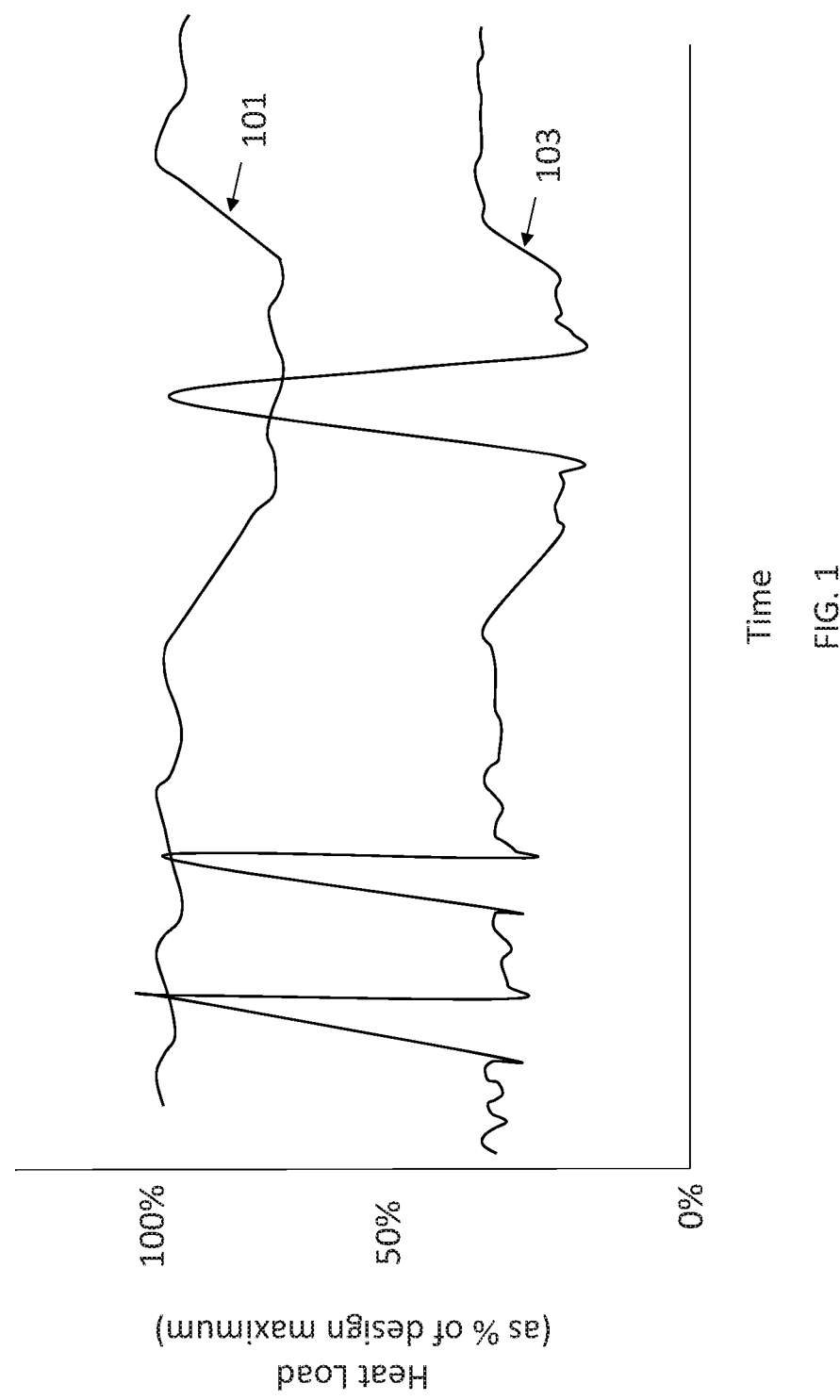
FIG. 1 is a graph of various heat loads with respect to time.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Conventional methods of rejecting heat from a heat transfer system, e.g., a refrigerant system, requires sizing the heat-rejecting component(s), e.g., a condenser, fans, etc., for a maximum design ambient temperature and maximum design heat loads. Such methods may work well for a heat load with little variation, such as heat load 101 shown in FIG. 1. Heat load 101 may be, for example, a building in which the variation in heat load 101 is driven by daily fluctuations in ambient temperature and building use. However, this design philosophy results in heat-rejecting components, e.g., condensers and/or fans, that may be much larger than what is required for average ambient temperatures and/or average loads, particularly for systems having widely varying and/or intermittent loads such as heat load 103. Heat load 103 may have a low, steady state heat load that is periodically interrupted by short periods of significantly higher heat loads. Additionally, the temperature of cooled load, or the temperature at which the load is to be maintained, may be different during the low, steady state heat load and the higher heat load. A system designed to accommodate heat load 103 typically would size the heat-rejecting components, like the condenser, to handle the larger, less frequent load, resulting in condenser that is much larger and/or fans that are required to provide significantly more airflow (and power required to drive those fans) than what is required to support the lower, average load. These system designs occupy more volume, weigh more, may require more power for transfer of cooling fluid or air, and may respond more slowly during transients.

Figure 2:
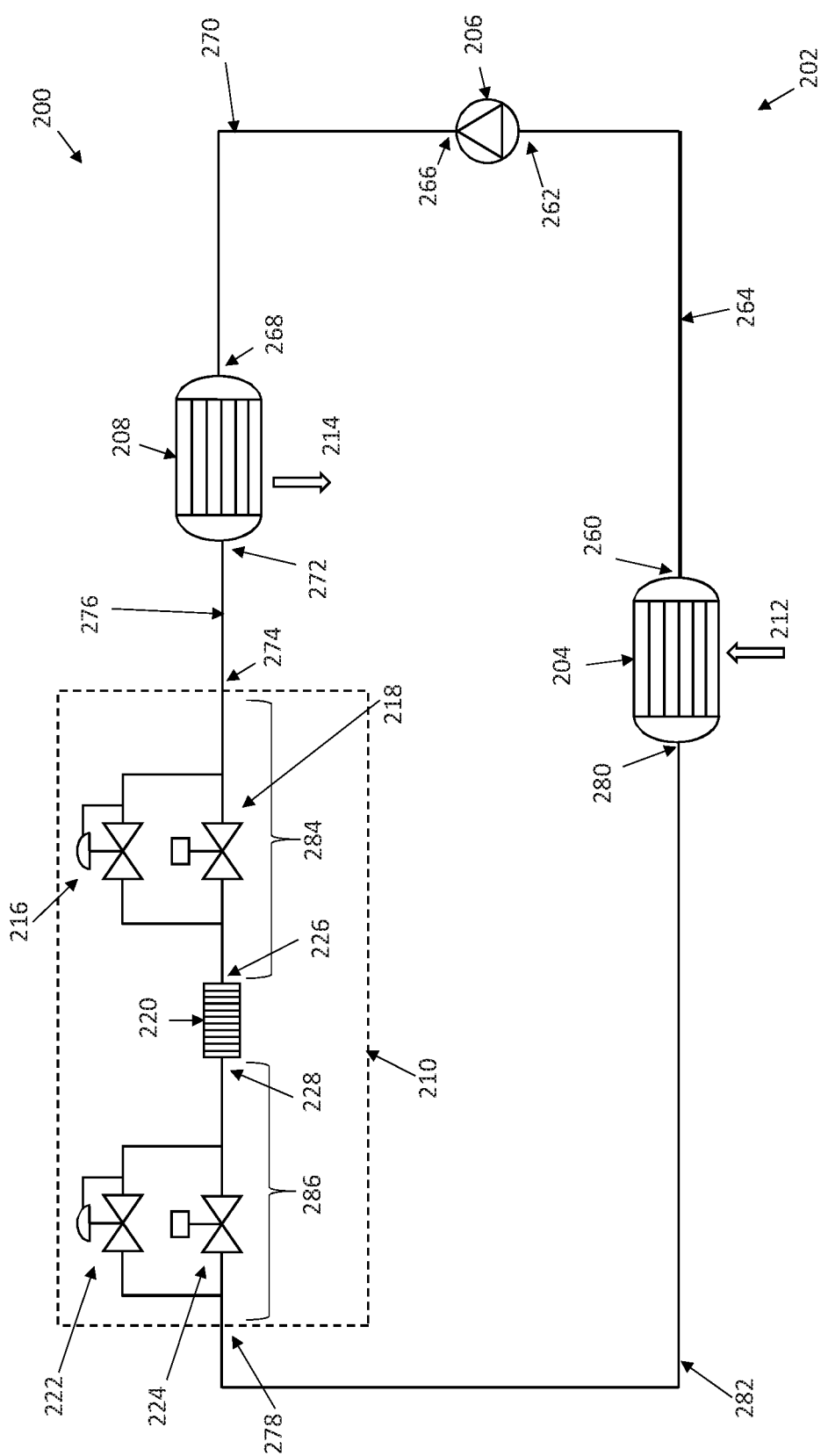
FIG. 2 illustrates a heat transfer system in accordance with some embodiments.

In accordance with some embodiments, a heat transfer system 200 is illustrated in FIG. 2. The system 200 may comprise a primary fluid flow path 202 having a primary fluid disposed therein. The primary fluid flow path 202 may comprise various components configured to transfer the heat from one location and dispose of it into another. These other components may comprise heat exchanger 204, compressor 206, condenser 208, and thermal energy storage (TES) section 210. These components may be arranged in a loop such that each subsequent component, as listed in the order above, being located downstream of the prior components and the effluent of the TES section 210 being returned to the heat exchanger 204 to complete the loop.

Each of above components forming the primary fluid flow path 202 may be coupled to one another via one or more conduits. For example, the outlet 260 of heat exchanger 204 may be coupled to the inlet 262 of compressor 206 via the heat-exchanger-compressor conduit 264; the outlet 266 of compressor 206 may be coupled to the inlet 268 of condenser 208 by the compressor-condenser conduit 270; the outlet 272 of condenser 208 may be coupled to the inlet 274 of TES section 210 by condenser-TES-section conduit 276; and, outlet 278 of TES section 210 may be coupled to the inlet 280 of heat exchanger 204 by a TES-section-heat-exchanger conduit 282.

Primary fluid flow path 202 may comprise additional components and/or conduits, some of which are described herein. The primary fluid flow path 202 may form a closed fluid flow path, meaning that the system 200 is designed such that the primary fluid does not intentionally enter or leave the primary fluid flow path 202 during normal operation. Being characterized as closed does not prohibit, however, primary fluid from being added to or removed from the primary fluid flow path 202 to make up for leaks, change of the primary fluid after fluid degradation, or for some other maintenance or repair procedure.

The primary fluid disposed with the primary fluid flow path 202 can be any appropriate fluid, vapor or liquid, capable of achieving the desired heat transfer. For example, the primary fluid may be water or a refrigerant. The particular fluid for system 200 can be dependent upon the heat load and the temperature of the environments/systems that transfer heat into or out of the system 200.

Heat exchanger 204 may be of suitable type for transferring heat 212 into the primary fluid, which runs in the cold-side channels (or tubes or other appropriate geometry) of heat exchanger 204. Heat exchanger 204 may be a heat source or load. The hot-side channels may be filled with fluid, e.g., water or air, from the environment/system to be cooled. Heat exchanger 204 may be a parallel-flow, cross-flow, multi-pass-flow, or counter-flow heat exchanger. In some embodiments, heat exchanger 204 is an evaporator that evaporates a portion or all of the primary fluid flowing therein. In some embodiments, heat exchanger 204 may comprise a series of conduits thermally coupled to a heat source or load that is not a fluid. For example, the conduits of heat exchanger 204 may be placed in thermal proximity, contact, or coupling with a solid structure that produces heat such that this heat is transferred into and removed by the primary fluid.

Figure 3:
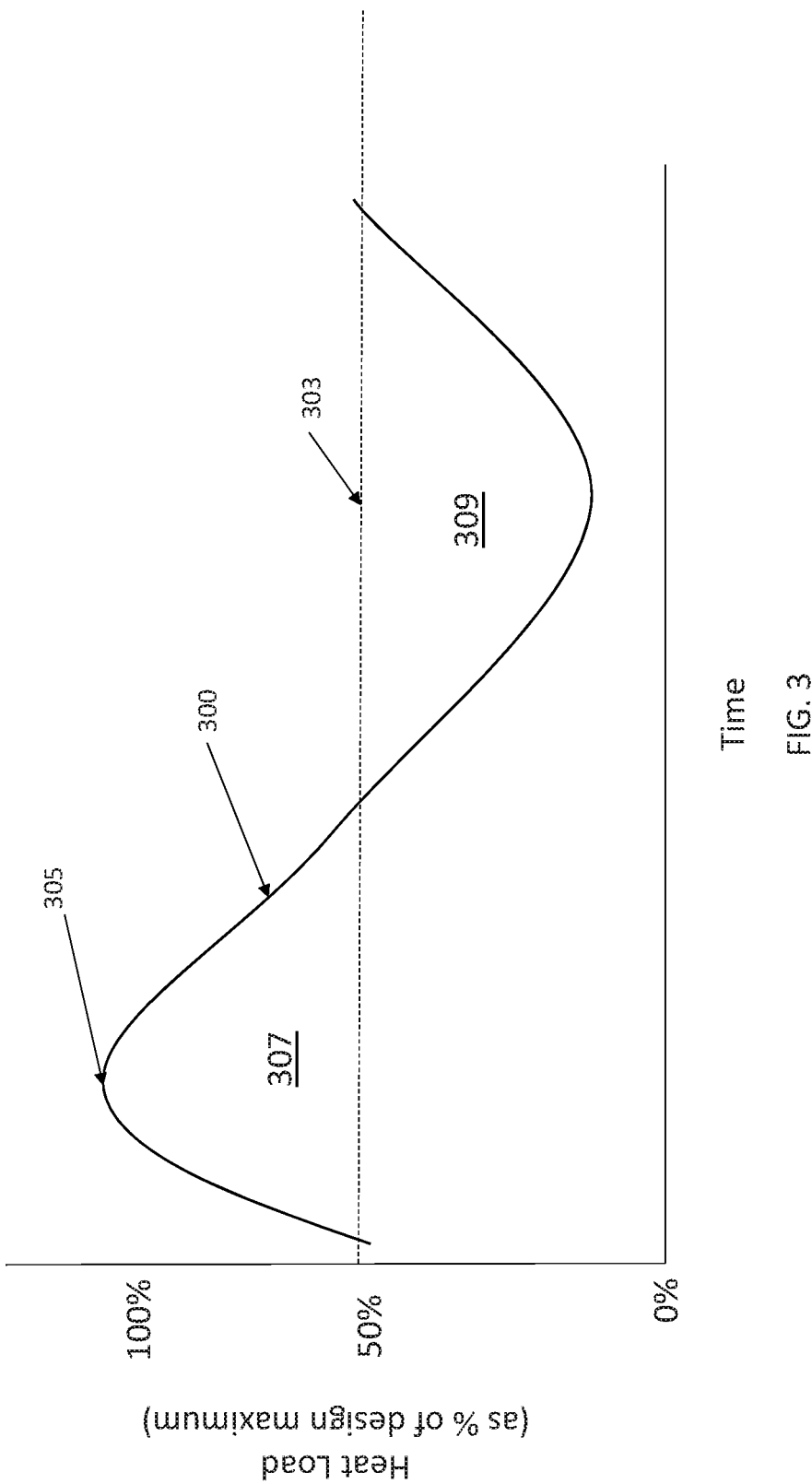
FIG. 3 is a graph of a heat load with respect to time.

The heat transfer 212 into the primary fluid in heat exchanger 204 may be a variable load such as heat load 103 as shown in FIG. 1. Another example of a variable load 300 is illustrated in FIG. 3. As can be seen, heat load 300 is above its average heat load 303 for only a portion of time. A typical heat transfer system would be sized based on the peak heat load 305. This design results in a condenser, compressor, and/or fans that are oversized for all but the peak heat load 305.

Compressor 206 raises the pressure of the primary fluid. This increase in pressure may be used to provide the workflow required to circulate the primary fluid within the primary fluid flowpath 202. Raising the pressure of the primary fluid may also raise the temperature of the primary fluid, thereby allowing heat to be rejected from the primary fluid in the condenser 208. In some embodiments, compressor 206 may be a pump configured to raise the pressure of liquid, such as in an absorption system (see FIG. 7, discussed below).

Condenser 208 receives the higher-temperature/pressure primary fluid from the compressor 206. Condenser 208 may be a heat exchanger that rejects heat 214 from the primary fluid to a heat sink which may be, e.g., the ambient environment. Condenser 208 may be a parallel-flow, counterflow, multi-pass-flow, or cross-flow heat exchanger. The primary fluid may run in the hot-side channels of condenser 208. The cold-side channels of condenser 208 may be filled with a fluid from the heat sink, e.g., ambient air.

Condenser 208 may be sized such that the condenser 208 may be insufficient to condense and/or sub cool all of the primary fluid flowing therethrough when heat input 212 and compressor 206 power and heat input is sufficiently larger than heat-out 214 (a person of ordinary skill will recognize that the energy inputted into system 200 must be rejected at some point in order for the system 200 to continue effective operation; as such, heat input 212 can be considered as including additional sources of energy (from, e.g., pump work) even if not expressly stated herein). To accommodate this intermittent, maximum load, system 200 may comprise a TES section 210 to which heat may be temporarily rejected. Once the heat input 212 and compressor 206 power and heat input drops below a particular rate relative to rate of heat output 214 of condenser 208, condenser 208 may condense and/or sub cool the primary fluid. This primary fluid is then used to cool, or "recharge," the thermal capacity of TES section 210.

With reference to FIG. 3, if the condenser 208 is sized to accommodate the average heat load 303, a heat input above the average 303, as represented by heat-excess area 307, will prevent the condenser from condensing and/or sub cooling the primary fluid. During this period, the supplemental heat capacity of TES section 210 is used to make up for the deficiency of the condenser 208. When the heat load 300 is less than the average heat load 303, as represented by the area 309 in FIG. 3, the condenser 208 has capacity to condense and/or sub cool a portion or all of the primary fluid that may be subsequently used to recharge the TES section 210 (and, in particular, the TES unit 220 as described below) while concurrently rejecting the heat from heat load 212.

In some embodiments, condenser 208 may comprise a force ventilation unit (not shown), such as a fan, that increases the flow rate of the ambient environment fluid over condenser 208. The "sizing" of the condenser 208 may factor in the addition of the forced ventilation unit.

To provide this thermal capacity, TES section 210 may comprise several components, including pressure regulating valve 216, bypass valve 218, TES unit 220, pressure regulating valve 222, and bypass valve 224.

TES unit 220 has an inlet 226 and outlet 228. Inlet 226 of TES unit 220 is downstream of and coupled to TES section inlet 274 by TES-section-TES-unit-inlet conduit 284. Outlet 228 of TES unit 220 is upstream of and coupled to TES section outlet 278 by TES-section-TES-unit-outlet conduit 286. As shown in FIG. 2 and other figures, the conduits coupling the TES unit 220 to the inlet and/or outlet of the TES section 210 may have various components disposed therein and/or coupled in parallel with all or a portion of the conduits.

TES unit 220 provides a secondary heat sink for the primary fluid disposed in the primary fluid flow path 202. When the heat input 212 from heat exchanger 204 and compressor 206 power and heat input is sufficiently large such that the heat output 214 of condenser 208 cannot fully condense the primary fluid within the condenser 208, TES unit 220 provides a supplemental heat sink that can condense the remaining vapor of the primary fluid. While heat can be rejected to TES unit 220 to complete this condensing, TES unit 220 may have a limited thermal capacity such that only a limited amount of heat can be rejected to TES unit 220. For an intermittent heat load, the thermal capacity of TES unit 220 can be sized to match the difference between the average heat load and the maximum heat load over a designed period of time. After the thermal capacity of the TES unit 220 has been exceeded, TES unit 220 must be recharge for subsequent heat loads that exceed the thermal output capacity of condenser 208.

Examples of materials that may form TES unit 220 include phase change materials, chilled water, chilled coolant, two-phase mixtures such as water and ice, or other suitable material.

TES section 210 may further comprise pressure regulating valve 216, bypass valve 218, pressure regulating valve 222, and bypass valve 224. These components may aid in using TES unit 220 as a heat sink and providing primary fluid to TES unit 220 at a temperature that recharges the thermal capacity of TES unit 220.

During steady-state periods of high heat loads for which the condenser 208 is unable to fully condense the primary fluid, bypass valve 218 is open and bypass valve 224 is shut. Primary fluid flowing through valve 218 bypasses pressure regulating valve 216. With bypass valve 224 being closed, pressure regulating valve 222 maintains the pressure of the primary fluid upstream of pressure regulating valve 222 at saturation pressure through both the condenser 208 and TES unit 220. Primary fluid flowing in condenser 208 is partially condensed, and flows through bypass valve 218 to TES unit 220 that completes the condensing process. TES unit 220 may sub cool the primary fluid. The liquid primary fluid is then expanded across pressure regulating valve 222, dropping the primary fluid temperature prior to the fluid returning to heat exchanger 204.

During the transition from the lower heat loads to the above stated steady state high heat load operation, pressure regulating valve 216 will regulate the pressure in condenser 208 and pressure regulating valve 222 will regulate pressure in the TES unit 220 independently from one another. Pressure regulating valve 216 may be fully open when bypass valve 218 is fully opened. After pressure regulating valve 216 is fully open, pressure regulating valve 222 will regulate the pressure in the condenser 208 and TES unit 220. Bypass valve 224 may be shut during this operation. The pressure of the primary fluid in the TES unit 220 may be set to maximize heat rejection, target a specific heat duty, or provide a specific amount of sub-cooling at the outlet of TES unit 220. The pressure within the condenser 208 may be set to maximize condenser heat rejection, keep the compressor 206 operational, or provide a specified sub-cool at the outlet of the condenser 208.

During operations in which the condenser 208 is able to fully condense, and possibly sub-cool, the primary fluid, the TES unit may be recharge at a maximum rate by operating the system such that bypass valve 218 is shut and bypass valve 224 is opened. With valve 218 shut, pressure regulating valve 216 maintains the primary fluid pressure in the condenser 208 at saturation pressure. The primary fluid is fully condensed, and possibly sub cooled, by the condenser 208. Primary fluid is expanded across pressure regulating valve 216, dropping the temperature of the primary fluid as its heat energy is used to vaporize all or a portion of the primary fluid. The lower temperature primary fluid flows through TES unit 220, extracting heat from TES unit 220 when TES unit 220 is at a higher temperature than the primary fluid. This heat transfer recharges the thermal capacity of the TES unit. The primary fluid mixture then flows through valve 224, bypassing pressure regulating valve 222, on its way to heat exchanger 204 as a vapor or a vapor-liquid mixture.

During a transition from operations during which TES unit 220 is required to supplement condenser 208 to operations in which the TES unit is recharged at the maximum rate, pressure regulating valve 222 may regulate the pressure of the TES unit 220 independently of the pressure in condenser 208. Pressure regulating valve 222 may being to open during this transition. When pressure regulating valve 222 is fully open bypass valve 224 is also fully open. Bypass valve 218 is shut for the duration such that pressure regulating valve 216 is able to regulate the pressure within condenser 208.

Condenser 208 may also be configured to operate in different modes, e.g., with or without forced ventilation. The condenser 208 may be sized such that the average heat load 212 and the compressor 206 power and heat transferred into the primary fluid exceeds the ability of the condenser 208 to reject heat out 214 during a mode where no forced ventilation is provided. TES unit 220 may provide the additional heat rejection capacity during such a mode of operation.

Pressure regulating valves 216 and 222 may be backpressure regulating valves. Bypass valves 218 and 224 may be solenoid valves that are operated based on the parameters of the primary fluid (e.g., temperature and pressure, advanced logic control).

Each pressure regulating valve 216 and 222 and its associated bypass valve 218 and 224, respectively, may be replaced with a single, accurate, fast-acting control valve. For example, the replacement valve for pressure regulating valve 222 and bypass 224 may be a diaphragm back pressure regulating valve or a pneumatically driven valve. This replacement valve should be able to handle the primary fluid flow in all states (i.e., vapor, liquid) and accurately control the sub cooling of the primary fluid. These features are important if the compressor 206 and condenser 208 cannot keep up with the rate of evaporation of the TES unit 220 at low saturation pressures/temperatures (i.e., the temperature of refrigerant required to cool the TES may not be maintained). By using downstream control of the cooling of the primary fluid at the TES unit 220, the saturation pressure and temperature of the TES unit 220 can be regulated thereby regulating the heat transfer rate at the TES unit 220 without impacting the lower-pressure primary fluid downstream of the TES section 210.

Embodiments in which a bypass valve is connected in parallel with a pressure regulating valve may avoid the pressure drop that may occur across a fully open pressure regulating valve.

As another example, the replacement valve for pressure regulating valve 216 and bypass valve 218 may be a diaphragm-style back-pressure regulating valve, typically pneumatically, spring or electronically controlled valve. This replacement valve should be accurate and fast-acting.

Figure 4:
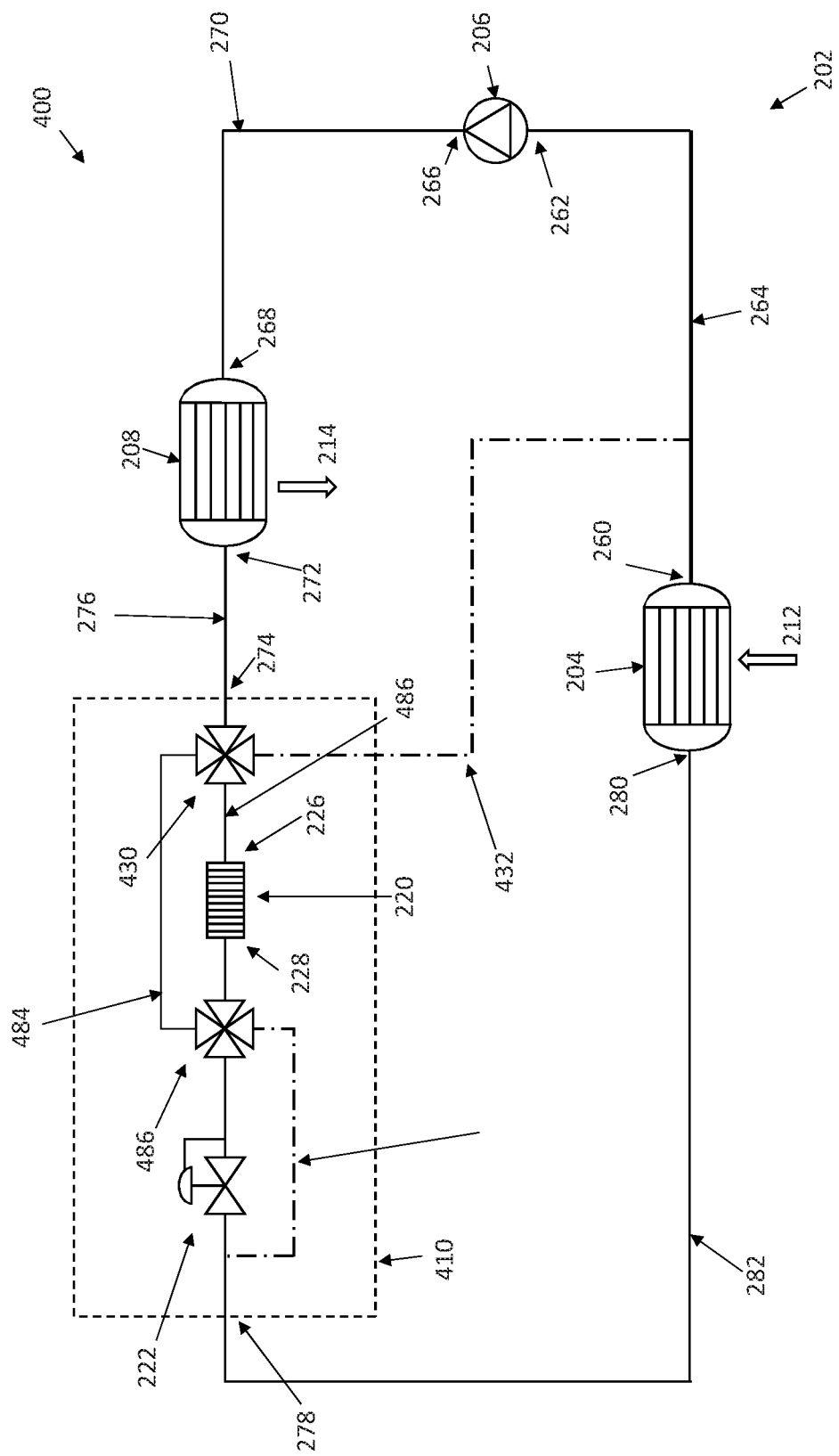
FIG. 4 illustrates a heat transfer system in accordance with some embodiments.

In accordance with some embodiments, a diagram of a heat transfer system 400 is provided in FIG. 4. Heat transfer system 400 is comprised of many of the same components performing the same functions as those described herein elsewhere. The primary differences between heat transfer systems 200 and 400 are located within TES sections 210 and 410. In TES section 410, four-way valves 430 and 486 are disposed in TES section 410 to bypass, utilize, or cool TES unit 220 using conduits 484 and 486 as well as TES cooling fluid conduit 432.

During operations in which the heat load input 212 and compressor 206 heat and power input can be accommodated by the heat output 214 of condenser 208, four-way valve 430 is positioned to direct the liquid, possibly sub cooled, primary fluid from the effluent of condenser 208 to pressure regulating valve 222 via conduit 484 and bypass valve 486. Like above, pressure regulating valve 222 maintains the pressure in condenser 208 at saturation conditions to ensure that the primary fluid is condensed and/or sub-cooled in condenser 208. Primary fluid is expanded across pressure regulating valve 222. A portion of the expanded primary fluid is directed through TES cooling fluid conduit 432 and bypass valve 486 to TES unit 220, thereby providing a supply of chilled primary fluid to cool and recharge TES unit 220. After cooling TES unit 220, the fluid flows through bypass valve 430 to the heat-exchanger-compressor conduit 264 via TES cooling fluid conduit 432.

The portion of fluid that does not flow through TES cooling fluid conduit is provided to the inlet 280 of heat exchanger 204 via the TES-section-heat-exchanger conduit 282.

During operations with a heat input 212 plus compressor 206 power and heat input that exceeds the capacity of condenser 208 to fully condense the primary fluid, four-way valve 430 is positioned to route the effluent of condenser 208 to TES unit 220 via conduit 486. The TES unit 220 completes the condensing and/or sub cooling of the primary fluid. Fluid is then directed to the pressure regulating valve 222 via bypass valve 486. Pressure regulating valve 222 maintains the upstream primary fluid pressure at conditions necessary to promote the required heat transfer. The primary fluid is expanded across pressure regulating valve 222 and provided back to heat exchanger 204. Four-way valves 430 and/or 486 are positioned to prevent the flow of primary fluid in the TES cooling fluid conduit 432 and conduit 484 during this mode of operation.

In some embodiments, TES cooling fluid conduit 432 is connected between a portion of the TES-section-heat-exchanger conduit 282 and four-way valve 486.

While some embodiments described here incorporated a TES section into vapor compression cycle refrigeration system, it should be understood that the advantages of incorporating a TES section can be enjoyed in other refrigeration systems, with the TES section supplementing the heat rejecting components of those other systems. As such, nothing herein should be construed as limiting the incorporation of a TES section to only a vapor compression system.

Figure 5:
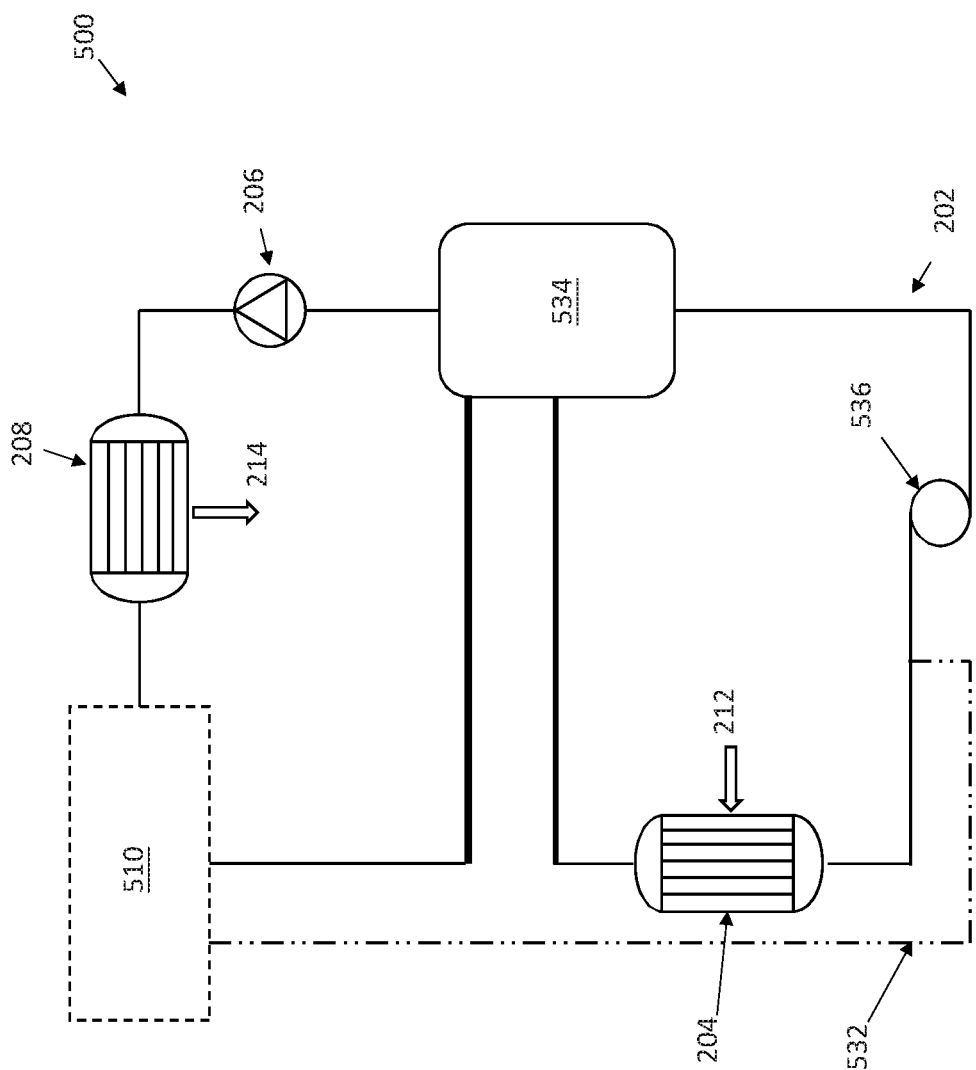
FIG. 5 illustrates a heat transfer system in accordance with some embodiments.

An example of another system is provided for in FIG. 5. FIG. 5 illustrate a heat transfer system 500 in accordance with some embodiments. Heat transfer system 500 may comprise similar components performing similar functions as described elsewhere herein. It should be understood that many of these components are omitted from FIG. 5 for ease of reading.

In addition to components described with respect to other systems, heat transfer system further comprises an accumulator 534 and a pump 536. The additional components are combined with the illustrated vapor compression system to form what is called a liquid overfeed system. Further details and embodiments of liquid overfeed systems are provided for in the concurrently filed and related U.S. application Ser. No. 16/380,644 entitled "MECHANICALLY PUMPED SYSTEM FOR DIRECT CONTROL OF TWO-PHASE ISOTHERMAL EVAPORATION", first named inventor: Eugene Jansen. The entirety of which is hereby incorporated by reference.

Accumulator 534 is located between the effluent of TES section 510 (which may be TES section 210 and/or 410) and the suction of compressor 206. The accumulator 534 provides several functions, including at least providing a surge volume of refrigerant for supply to heat exchanger 204, providing pump head for pump 536, and separating the vapor/liquid mixture from the effluent of both the TES section 510 and evaporator 204. As such, accumulator 534 has at least two inputs and two outputs. The inputs are from the effluents of the TES section 510 and evaporator 204. The two outputs are from vapor supplied to the compressor 206 and the fluid supplied to pump 536.

For embodiments that utilize a TES cooling fluid conduit 532, the conduit may be placed downstream of pump 536, thereby coupling the outlet of pump 536 and a valve in the TES section 510, e.g., input of four-way valve 486 of TES section 410. Other locations may also serve as the initiating point of TES cooling fluid conduit 532.

Figure 6:
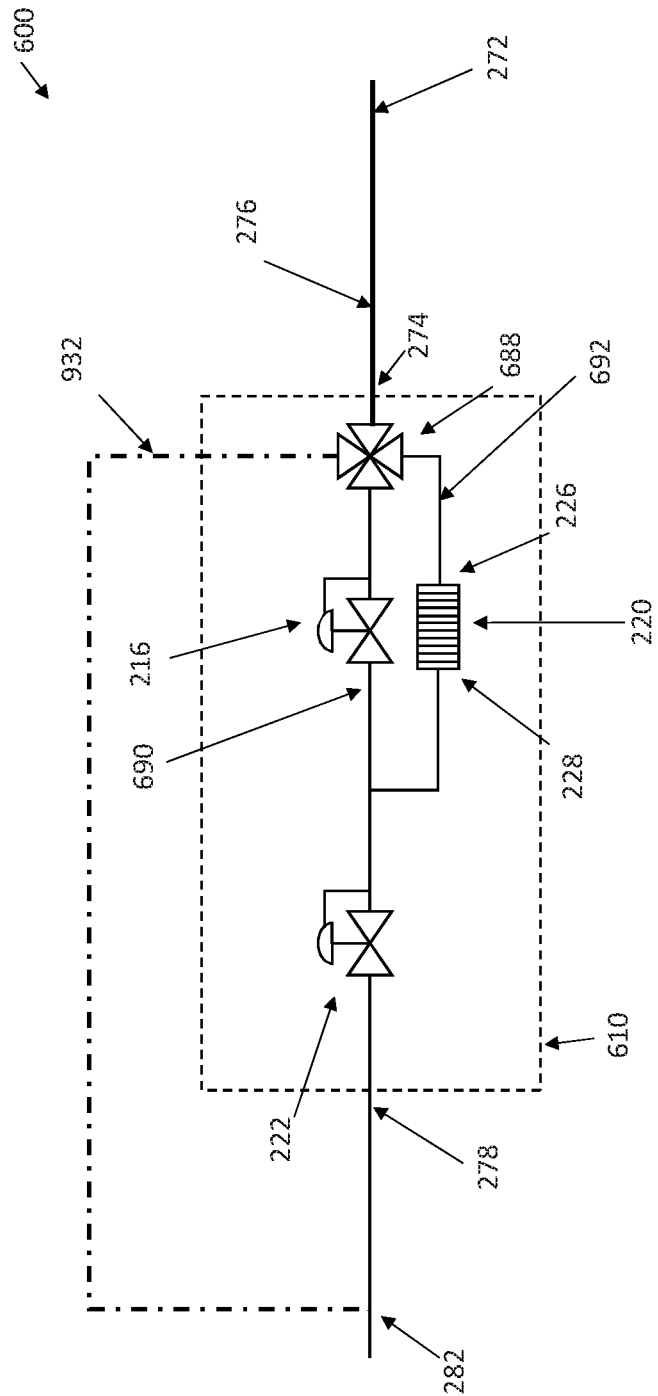
FIG. 6 illustrates a heat transfer system in accordance with some embodiments.

In accordance with some embodiments, a heat transfer system 600 is illustrated in FIG. 6. Heat transfer system 600 is comprised of many of the same components performing the same functions as those described elsewhere herein. It should be understood that several components of heat transfer system 600 have been omitted for clarity. The primary differences between heat transfer systems 200, 400 and 600 are located within TES sections 210, 410 and 610. In TES section 610, a four-way valve 688 is disposed between the upstream side of both pressure regulating valve 216 and TES unit 220 and the outlet 272 of the condenser 208. Downstream of both pressure regulating valve 216 and TES unit 220 is pressure regulating valve 222. Unlike heat transfer system 200 and 400, pressure regulating valve 216 is not upstream of TES unit 220 in system 600. Additionally, TES section 610 comprises a TES unit cooling fluid conduit 932 that is located downstream of pressure regulating valve 222 and fluidically couples this location to an inlet of four-way valve 688. For example, TES unit cooling fluid conduit 932 may be coupled to the outlet of pump 536 as shown in FIG. 5 such that accumulator 534 is located within TES-section-heat-exchanger conduit 282 between the outlet 278 and the branch-off point of TES unit cooling fluid conduit 932.

During operations in which the heat load input 212 plus compressor 206 power and heat input can be accommodated by the heat output 214 of condenser 208, four-way valve 688 is positioned to direct the liquid, possibly sub cooled, primary fluid from the effluent of condenser 208 to pressure regulating valve 216 via conduit 690. Like above, pressure regulating valve 216 maintains the pressure in condenser 208 at saturation conditions to ensure that the primary fluid is condensed in condenser 208. Primary fluid is expanded across pressure regulating valve 216 and then flows to pressure regulating valve 222, which is fully open and is not maintaining upstream primary fluid pressure. A portion of the expanded primary fluid may be directed through TES cooling fluid conduit 932 and the four-way valve 688 to TES unit 220, thereby providing a supply of chilled primary fluid to cool and recharge TES unit 220. A pump, e.g. pump 536, may supply the pump work require to drive the primary fluid through TES cooling fluid conduit 932. The outlet 278 of TES section 610 is coupled to the accumulator 534 at a point upstream of the branch-off of TES cooling fluid conduit 932.

During operations with a heat input 212 that exceeds the capacity of condenser 208 to fully condense the primary fluid, four-way valve 688 is positioned to route the effluent of condenser 208 to TES unit 220 via conduit 692, bypassing pressure regulating valve 216. The TES unit 220 completes the condensing and/or sub cooling of the primary fluid. Pressure regulating valve 222 maintains the upstream primary fluid pressure at conditions necessary to transfer the required heat. The primary fluid is expanded across pressure regulating valve 222 and provided back to heat exchanger 204. Four-way valve 688 is positioned to prevent the flow of primary fluid in the TES cooling fluid conduit 932 during this mode of operation.

Figure 7:
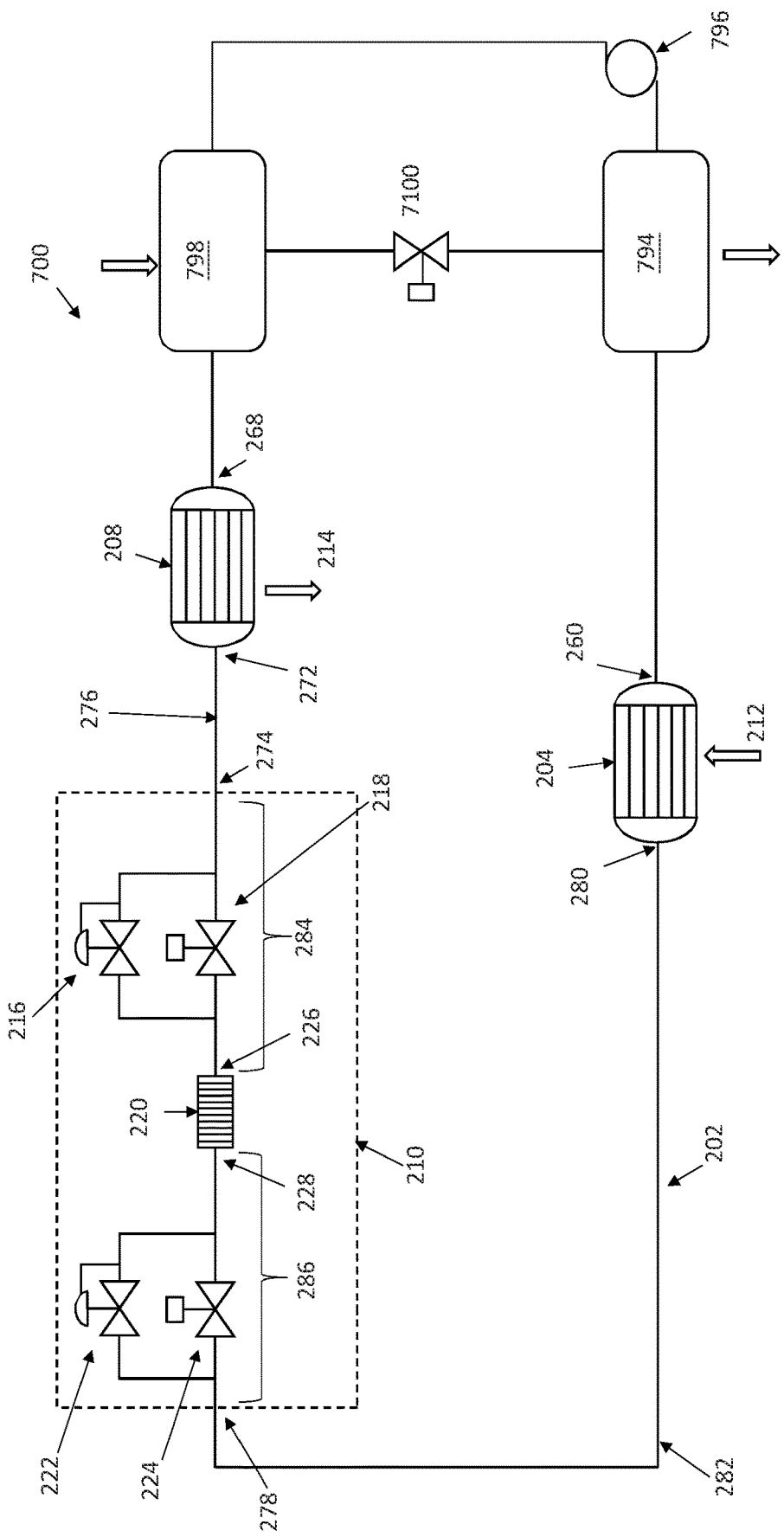
FIG. 7 illustrates a heat transfer system in accordance with some embodiments.

In accordance with some embodiments, a heat transfer system 700 is illustrated in FIG. 7. System 700 may comprise many of the same components that perform the same functions as described above. System 700 differs from those disclosed in that it does not contain a vapor compression loop. Rather, system 700 is an adsorption system that comprises absorber 794, pump 796, generator 798, and valve 7100. Primary fluid from heat exchanger 204 is provided to absorber 794 wherein the primary fluid is absorbed into an absorbent while heat is rejected. The absorbent/primary fluid mixture is sent via pump 796 to generator 798. In Generator 798, heat is provided to the generator, thereby releasing the absorbed primary fluid for flow to condenser 208, TES section 210, and then returning to heat exchanger 204. Absorbent is allowed to return to the absorbed 794 via valve 7100, which also functions to maintain a pressure differential between generator 798 and absorber 794.

While the above illustrated system 700 utilizes TES section 210, it should be understood that this absorption system may also utilize TES section 410, 510, or 610 and their manner of interfacing with the rest of the systems disclosed above.

Although examples are illustrated and described herein, embodiments are nevertheless not limited to the details shown, since various modifications and structural changes may be made therein by those of ordinary skill within the scope and range of equivalents of the claims. A person of ordinary skill will recognize that the particular valves disclosed herein may be replaced with other, functionally equivalent arrangements. For example, the herein disclosed 4-way valves may be replaced with combinations of 3-way valves, 2-way valves, or both.

What is claimed is:

1. A heat transfer system comprising:
   a primary fluid; and
   a primary fluid flow path, said primary fluid disposed in said primary fluid flow path, said primary fluid flow path comprising:

a heat exchanger having an inlet and an outlet, wherein said heat exchanger transfers heat into said primary fluid;

a compressor having a compressor inlet and a compressor outlet, wherein said compressor inlet is downstream of and coupled to said heat exchanger outlet by a heat-exchanger-compressor conduit;

a condenser having a condenser inlet and a condenser outlet, wherein said condenser inlet is downstream of and coupled to said compressor outlet by a compressor-condenser conduit, wherein said condenser transfers heat out of said primary fluid; and a thermal energy storage (TES) section, said TES section comprising:

an inlet and an outlet, wherein the inlet of said TES section is downstream of and coupled to said condenser outlet by a condenser-TES-section conduit, and the outlet of said TES-section is upstream of and coupled to said heat exchanger inlet by a TES-section-heat-exchanger conduit;

a TES having an inlet and outlet, wherein the inlet of said TES is downstream of and coupled to the inlet of said TES section by a TES-section-TES-unit-inlet conduit and the outlet of said TES is upstream of and coupled to the outlet of said TES section by a TES-unit-TES-section-outlet conduit;

a first pressure regulating valve downstream of said TES; and a second pressure regulating valve upstream of said first pressure regulating valve and downstream of said condenser;

a first bypass valve upstream of said TES and downstream of said condenser;

wherein said second pressure regulating valve maintains said primary fluid at said condenser outlet at a first state when the heat transferred into a portion of said primary fluid by said heat exchanger is equal to or less than the heat transferred out of said portion of said primary fluid by said condenser, and wherein said first pressure regulating valve maintains said primary fluid at the outlet of said TES at said first state when the heat transferred into a portion of said primary fluid by said heat exchanger is greater than the heat transferred out of said portion of said primary fluid by said condenser, and wherein said TES section maintains said primary fluid at the outlet of said TES section as a liquid-vapor mixture.

2. The system of claim 1, wherein said first bypass valve is in parallel with said second pressure regulating valve.

3. The system of claim 2, wherein said second pressure regulating valve maintains said primary fluid at the inlet of said TES as a liquid-vapor mixture.

4. The system of claim 2, further comprising:

a second bypass valve upstream of said TES and coupled in parallel with said second pressure regulating valve.

5. The system of claim 1, wherein said second pressure regulating valve is upstream of said TES.

6. A heat transfer system comprising:

a primary fluid; and a closed primary fluid flow path, said primary fluid disposed in said closed primary fluid flow path, said closed primary fluid flow path comprising in a direction of fluid flow:

a first heat source;

a compressor;

a condenser;

a first bypass valve in a first mode or a first pressure regulating valve in a second mode;

a thermal energy storage (TES); and a second pressure regulating valve in the first mode or a second bypass valve in the second mode, wherein said TES is a heat sink in the first mode and said TES is a second heat source or heat neutral in the second mode, wherein the first pressure regulating valve maintains said primary fluid at an outlet of the condenser at a first state in the second mode when the heat transferred into a portion of said primary fluid by said first heat source is equal to or less than the heat transferred out of said portion of said primary fluid by said condenser, and wherein said second pressure regulating valve maintains said primary fluid at an outlet of said TES at said first state in the first mode when the heat transferred into a portion of said primary fluid by said first heat source is greater than the heat transferred out of said portion of said primary fluid by said condenser.

* * * * *